United States Patent Office 3,375,292
Patented Mar. 26, 1968

3,375,292
DIOLEFIN PRODUCTION
Walter K. Henle, Orinda, Calif., assignor to Shell Oil Company, New York, N.Y., a corporation of Delaware
No Drawing. Filed Aug. 26, 1965, Ser. No. 482,926
8 Claims. (Cl. 260—680)

This invention relates to an improved process for the production of certain diolefins having two terminal ethylenic linkages wherein one carbon atom of each linkage is a tertiary carbon atom.

Methods are known in the art for the production of $\alpha,\alpha'$-diolefins wherein each $\beta$-carbon atom is a tertiary carbon atom. Such compounds are typically prepared by dehydration of the corresponding glycol; for example, Magat, U.S. 2,628,219 issued Feb. 10, 1953, discloses the production of 2,11-dimethyl-1,11-dodecadiene by this process. However, great difficulty is frequently attendant to the production of the prerequisite glycol. See, for example, the method disclosed by Schott et al., U.S. 2,850,591, issued Sept. 2, 1958, wherein $\beta,\beta'$-dialkyl-$\alpha,\alpha'$-glycols are produced by dimerization of a conjugated diene in the presence of alkali metal, reaction of the resulting dimetallo diene dimer derivative with a ketone to produce a dimetallo derivative of a glycol, and subsequent hydrolysis to liberate the free glycol.

It is an object of the present invention to provide an improved process for the production of certain $\alpha,\alpha'$-diolefins. More particularly, it is an object to provide an improved process for the production of $\alpha,\alpha'$-diolefins wherein a carbon atom of each ethylenic linkage is tertiary. A specific object is to provide a process for the production of certain $\beta,\beta'$-dialkyl-$\alpha,\alpha'$-diolefins of the $C_{14}$-$C_{18}$ range.

It has now been found that these objects are accomplished by the process of reacting certain polymeric aluminum alkyls with lower $\alpha$-olefins under conditions of elevated temperature.

Broadly speaking, the present invention contemplates the production of compounds of the formula

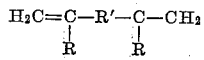

wherein R independently is alkyl and R' is divalent alkylene, by the reaction of a polymeric aluminum alkyl with a lower $\alpha$-olefin. Trialkylaluminum is an additional product. Although other polymeric aluminum alkyls are similarly operable, in the preferred modification of the invention, the polymeric aluminum alkyl to be employed is one wherein each alkyl moiety is an $\alpha,\omega$-divalent straight-chain $C_8$-moiety. Although, as in the case of any highly cross-linked polymeric material, the polymeric aluminum alkyl is not completely described by a single structure, it is considered that the aluminum reactant may be represented by the formula

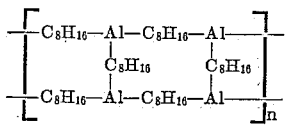

wherein $n$ is a very large number. Although it is further apparent that this polymeric material is not completely described by a simple chemical name, the above polymeric structure is herein referred to as dialumino tris-octamethylene, thereby indicating the composition ratio of two aluminum atoms for each three $C_8$ moieties.

The dialumino tris-octamethylene is conveniently prepared by reacting 1,7-octadiene with a trialkylaluminum or a dialkylaluminum hydride, wherein the alkyls are lower alkyl, e.g., alkyl of up to 4 carbon atoms, at an elevated temperature. The reaction may be conducted in the presence of solvent, but preferably is conducted by merely mixing the reactants and heating the mixture until reaction is complete. During reaction, the former lower alkyl substituents on the reactant trialkylaluminum or dialkylaluminum hydride are apparently replaced by the octadiene and the former lower alkyl substituents are observed as the corresponding olefin. For example, reaction of 1,7-octadiene with triisobutylaluminum or diisobutylaluminum hydride results in the production of dialumino tris-octamethylene and isobutylene. The polymeric dialumino tris-octamethylene is a hard, brittle glassy solid at room temperature which becomes viscous when heated above about 60° C.

The lower $\alpha$-olefin employed as a reactant in the present process is an olefin of at least three carbon atoms and of a carbon-carbon double bond between a terminal carbon atom thereof and the carbon atom adjacent thereto. Preferred $\alpha$-olefin reactants are acyclic hydrocarbon $\alpha$-olefins of from 3 to 5 carbon atoms, particularly the $\alpha$-olefins of this class which are straight chain; these are propylene, 1-butene and 1-pentene. Particularly suitable as the lower $\alpha$-olefin reactant is propylene.

In one modification of the present process, preformed dialumino tris-octamethylene and the lower $\alpha$-olefin are charged to a suitable reactor, e.g., an autoclave or similar pressure reactor, and maintained at reaction temperature until reaction is complete. The ratio of moles of $\alpha$-olefin to moles of divalent octamethylene moiety present in the polymeric aluminum alkyl is not critical, however it is desirable to employ at least a stoichiometric amount of lower $\alpha$-olefin, i.e., a molar ratio of lower $\alpha$-olefin to divalent octamethylene moiety of at least 4:1. In practice, best results are obtained when a molar excess of lower $\alpha$-olefin over the divalent octamethylene moiety is employed, so that molar ratios of $\alpha$-olefin to octamethylene moiety of from about 4:1 to about 20:1 are satisfactory, although molar ratios of from about 5:1 to about 10:1 are preferred.

The reaction is conducted at elevated temperatures and at a pressure that is least atmospheric. Reaction temperatures of from about 100° C. to about 200° C. are satisfactory, with the temperature range of from about 120° C. to about 170° C. being preferred. Although the process is operable when conducted at atmospheric pressure, it is generally preferred to employ a superatmospheric pressure of the lower $\alpha$-olefin reactant. Reaction pressures of from about 1 atmosphere to about 200 atmospheres are satisfactory with preferred reaction pressures varying from about 50 atmospheres to about 150 atmospheres. The process is suitably conducted in the presence of inert diluents, e.g., inert gaseous diluents such as methane, nitrogen, argon and the like, in which case the pressure is properly considered to be the sum of the partial pressures of the materials present in the reaction system other than diluent. In the preferred modification of the process, however, no added diluent is employed. It is also desirable to conduct the reaction in an inert environment, that is, in the substantial absence of materials such as oxygen, water, carbon dioxide and the like which are reactive toward the reactants and/or the products produced therefrom.

In an alternate modification of the process, the polymeric aluminum alkyl reactant is prepared and reacted in situ as by reaction of 1,7-octadiene with aluminum trialkyl in the presence of the lower $\alpha$-olefin reactant, which $\alpha$-olefin preferably corresponds to the alkyl moiety of the trialkylaluminum. For example, the desired reaction is suitably conducted by charging to a rector tripropylaluminum, 1,7-octadiene and a molar excess of propylene. The resulting products are equivalent to those produced by reaction of propylene with preformed dialumino tris-octamethylene. In this in situ modification, ratios of trialkylaluminum to 1,7-octadiene which are substantially stoichiometric are suitably employed, i.e., a ratio of trialkylaluminum to 1,7-octadiene of about 2:3, although the precise ratio is not critical and higher or lower ratios are also suitable. Amounts of lower α-olefin which are equivalent to or in excess over the amount of 1,7-octadiene are preferred, such as a molar ratio of lower α-olefin to 1,7-octadiene of from about 2:1 to about 10:1. In the "in situ" modification, it is on occasion useful to promote the reaction by adding to the reaction mixture an alkali metal chloride, particularly sodium chloride or potassium chloride. When present, molar ratios of the alkali metal chloride promoter to the trialkylaluminum of from about 2:1 to about 1:2 are satisfactory.

In either modification, subsequent to reaction, the product mixture is separated and the desired diolefin product is recovered by conventional methods, e.g. fractional distillation, selective extraction, fractional crystallization, complex formation and the like. Among the by-products observed are trialkylaluminum and 1,7-octadiene which are suitably recovered and recycled.

The products of the process of the invention are $\beta,\beta'$-dialkyl-$\alpha,\alpha'$-diolefins illustratively produced by combination of the lower α-olefin and 1,7-octadiene in a 2:1 ratio. By way of illustration, reaction of propylene with dialumino tris-octamethylene produces 2,11-dimethyl-1,11-dodecadiene along with lesser amounts of the isomeric diolefins 2-propyl-9-methyl-1,9-decadiene and 2,7-dipropyl-1,7-octadiene. In like manner, reaction of 1-butene with dialumino tris-octamethylene produces principally 2,11-diethyl-1,11-dodecadiene and analogous reaction of 1-pentene results in the formation of 2,11-dipropyl-1,11-dodecadiene as the major $\beta,\beta'$-dialkyl-$\alpha,\alpha'$-diolefin product.

The products of the invention find utility as chemical intermediates as in the production of linear polyamides according to the process of the above-identified U.S. 2,628,219. In addition, the diolefins are hydroxylated to form useful alcohols, are epoxidized to form epoxy resin precursors and are useful as monomers in the production of polymers or copolymers and as precursors of dibasic acids.

To further illustrate the improved process of the invention, the following examples are provided. It should be understood that the details thereof are not to be regarded as limitations as they may be varied as will be understood by one skilled in this art.

Example I

To a steel reactor equipped with a stirrer and a vent to release gaseous products was charged 0.41 mole of diisobutyl aluminum hydride and 0.6 mole of 1,7-octadiene. The mixture was maintained at atmospheric pressure and in the absence of moisture and oxygen, and was stirred at 130° C. for 10 hours, during which time 0.8 mole of isobutylene was liberated. The product, dialumino tris-octamethylene is a clear, colorless resinous material which is viscous above about 60° C. but becomes hard, brittle and glassy at room temperature and is easily powdered.

When the production of dialumino tris-octamethylene was repeated using 0.41 mole of triisobutyl aluminum in place of the diisobutyl aluminum hydride, 1.2 moles of isobutylene were liberated during reaction and a similar polymeric material was obtained.

Example II

In a steel reactor equipped with a magnetic stirrer and a vent to release gaseous reaction products, 0.41 mole of triisobutyl aluminum and 0.6 mole of 1,7-octadiene were reacted in 250 ml. of xylene at 130° C., during which time 1.1 moles of isobutylene were liberated. The volatile products were removed from the product mixture by vacuum distillation to afford dialumino tris-octamethylene, a viscous material which hardened to a glassy resin when cooled to room temperature.

Example III

In an autoclave, 49 g. (0.125 mole) of polymeric dialumino tris-octamethylene was contacted with 3 moles of propylene at an initial pressure of 1000 lbs. and a temperature of 120° C. for 16 hours. At the conclusion of this time, the pressure was less than 500 lbs. Subsequent to the venting of the excess propylene, the liquid product mixture was fractionally distilled under reduced pressure and at a temperature below 100° C. to yield, inter alia, 0.08 mole of 1,7-octadiene, 0.1 mole of a $C_{11}H_{20}$ dolefin, principally 2-methyl-1,10-undecadiene, and 0.1 mole of 2,11-dimethyl-1,11-dodecadiene. Also obtained was 0.2 mole of tripropylaluminum.

The distillation residue was treated with additional propylene at 120° C. and 1000 lbs. From the subsequent second distillation was obtained an additional 0.05 mole of the 2,11-dimethyl-1,11-dodecadiene and virtually all the remaining aluminum as tripropylaluminum.

Example IV

The procedure of Example III was repeated except that a reaction temperature of 140° C. and a propylene pressure of 1300 lbs. were employed. Upon removal of the excess propylene from the product mixture, 0.08 mole of 1,7-octadiene and 0.2 mole of isomeric $C_{14}H_{26}$ diolefins, principally 2,11-dimethyl-1,11-dodecadiene, were obtained upon distillation under reduced pressure.

Example V

The procedure of Example IV was repeated, except that 1-butene was employed in place of the propylene in the reaction with dialumino tris-octamethylene. The product mixture was separated by preparative gas-liquid chromatographic techniques and the products were identified by the charcateristic infrared and nuclear magnetic resonance spectra and mass spectrometric analysis. Observed as products were 0.05 mole of a $C_{12}H_{22}$ diolefin product, principally 2-ethyl-1,9-decadiene, and 0.15 mole of a $C_{14}H_{26}$ diolefin mixture, of which the principal component was 2,11-diethyl-1,11-dodecadiene. The aluminum was recovered as tri-n-butylaluminum.

Example VI

In an autoclave, a mixture of 0.25 mole tripropylaluminum, 0.375 mole of a dialumino tris-octamethylene and 3 moles of propylene was heated, with stirring, for 10 hours at 140° C. and 1200 lbs. pressure. Distillation of the resulting mixture at reduced pressure afforded 0.2 mole of $C_{14}H_{26}$, 0.05 mole of $C_{11}H_{20}$ and 0.03 mole of $C_8H_{14}$. At least 0.2 mole of tripropylaluminum was recovered.

When this experiment was repeated with the addition of 0.25 mole of calcined potassium chloride to the reaction mixture, the yield of the $C_{14}H_{26}$ diene was increased to 0.3 mole and little $C_{11}H_{20}$ was formed. In this experiment, the volatile tripropylaluminum was separated by complexing with sodium fluoride.

I claim as my invention:

1. The process of producing $\beta,\beta'$-dialkyl-$\alpha,\alpha'$-diolefin by intimately contacting dialumino tris-octamethylene with acyclic hydrocarbon α-olefin of from 3 to 5 carbon atoms at a temperature of from about 100° C. to about 200° C. and a pressure of from about 1 atmosphere to about 200 atmospheres, in an inert reaction environment.

2. The process of claim 1 wherein the α-olefin is propylene.

3. The process of claim 1 wherein the α-olefin is 1-butene.

4. The process of producing $\beta,\beta'$-dialkyl-$\alpha,\alpha'$-diolefin by intimately contacting dialumino tris-octamethylene with from about 4 moles to about 20 moles per mole of octamethylene moiety of acyclic straight-chain hydrocarbon α-olefin of from 3 to 5 carbon atoms at a temperature of from about 100° C. to about 200° C. and a pressure of from about 1 atmosphere to about 200 atmospheres, in an inert reaction environment.

5. The process of claim 4 wherein the α-olefin is propylene.

6. The process of producing 2,11-dimethyl-1,11-dodecadiene by intimately contacting dialumino tris-octamethylene with from about 4 moles to about 20 moles of propylene per mole of octamethylene moiety at a temperature of from about 120° C. to about 170° C. and a pressure of from about 50 atmospheres to about 150 atmospheres, in an inert reaction environment.

7. The process of producting β,β'-dialkyl-α,α'-diolefin by intimately contacting trialklaluminum wherein each alkyl is acyclic straight-chain hydrocarbon alkyl of from 3 to 5 carbon atoms, 1,7-octadiene and acyclic straight-chain hydrocarbon α-olefin of from 3 to 5 carbon atoms at a temperature of from about 100° C. to about 200° C. and a pressure of from about 50 atmospheres to about 150 atmospheres, in an inert reaction environment.

8. The process of producing β,β'-dialkyl-α,α'-diolefin by intimately contacting tripropylaluminum, about 1.5 mole of 1,7-octadiene per mole of tripropylaluminum, and from about 2 moles to about 10 moles of propylene per mole of 1,7-octadiene, at a temperature of from about 100° C. to about 200° C. and a pressure of from about 50 atmospheres to about 150 atmospheres in an inert reaction environment.

References Cited

UNITED STATES PATENTS

| | | | |
|---|---|---|---|
| 2,695,327 | 11/1954 | Ziegler | 260—683.15 |
| 3,180,837 | 4/1965 | Bruce et al. | 260—448 X |
| 3,325,524 | 6/1967 | Lundeen | 260—448 |

PAUL M. COUGHLAN, Jr., *Primary Examiner.*